(12) United States Patent
Billep et al.

(10) Patent No.: US 8,963,898 B2
(45) Date of Patent: Feb. 24, 2015

(54) CONTROL DEVICE FOR A MICROMIRROR, METHOD FOR CONTROLLING A MICROMIRROR AND IMAGE PROJECTION SYSTEM

(75) Inventors: Detlef Billep, Mittelbach (DE); Hendrik Specht, Pliezhausen (DE); Kurth Steffen, Thalhelm (DE); Thomas Hilberath, Eningen (DE); Thomas Gessner, Chemnitz (DE); Oliver Krayl, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 199 days.

(21) Appl. No.: 13/566,810

(22) Filed: Aug. 3, 2012

(65) Prior Publication Data
US 2013/0127800 A1 May 23, 2013

(30) Foreign Application Priority Data
Aug. 16, 2011 (DE) .......................... 10 2011 081 042

(51) Int. Cl.
G09G 5/00 (2006.01)
G02B 26/08 (2006.01)
G02B 26/10 (2006.01)

(52) U.S. Cl.
CPC .......... *G02B 26/0833* (2013.01); *G02B 26/101* (2013.01)
USPC ............................................ 345/204; 345/14

(58) Field of Classification Search
None
See application file for complete search history.

(56) References Cited

U.S. PATENT DOCUMENTS

| 5,382,961 | A | * | 1/1995 | Gale, Jr. ..................... 345/108 |
| 5,768,007 | A | * | 6/1998 | Knipe et al. .................. 359/290 |
| 6,749,346 | B1 | * | 6/2004 | Dickensheets et al. ......... 385/88 |
| 7,075,693 | B2 | * | 7/2006 | Ljungblad ..................... 359/237 |
| 7,236,680 | B1 | * | 6/2007 | Jordan ......................... 385/147 |
| 7,515,329 | B2 | * | 4/2009 | Sprague et al. ............... 359/292 |
| 8,395,877 | B2 | * | 3/2013 | Pozidis et al. ................ 361/233 |
| 8,446,342 | B2 | * | 5/2013 | Champion et al. .............. 345/15 |
| 2006/0017689 | A1 | * | 1/2006 | Faase et al. .................. 345/108 |
| 2006/0028533 | A1 | * | 2/2006 | Nakajima ..................... 347/233 |
| 2006/0092147 | A1 | * | 5/2006 | Roberts ....................... 345/204 |
| 2006/0187218 | A1 | * | 8/2006 | Hwangbo et al. .............. 345/204 |
| 2008/0143435 | A1 | * | 6/2008 | Wilson et al. ................. 329/342 |
| 2008/0218835 | A1 | * | 9/2008 | Sandner et al. ............... 359/238 |
| 2008/0239252 | A1 | * | 10/2008 | Konno et al. .................. 353/98 |
| 2008/0285103 | A1 | * | 11/2008 | Mizumoto ..................... 359/199 |
| 2009/0091713 | A1 | * | 4/2009 | Shirai et al. ................... 353/31 |
| 2010/0019686 | A1 | * | 1/2010 | Gutierrez, Jr. ................ 315/291 |
| 2010/0295866 | A1 | * | 11/2010 | Ishii ........................... 345/597 |
| 2011/0122101 | A1 | * | 5/2011 | Kurozuka ..................... 345/204 |
| 2012/0062978 | A1 | * | 3/2012 | De Smet et al. ............... 359/290 |

* cited by examiner

*Primary Examiner* — Antonio Xavier
(74) *Attorney, Agent, or Firm* — Kenyon & Kenyon LLP (57) ABSTRACT

A method for controlling a micro-mirror, having the following: generating a first control signal which encodes a tilting motion of the micro-mirror about a first tilt axis, at a first frequency; generating a second control signal which encodes a tilting motion of the micro-mirror about a second tilt axis which is perpendicular to the first tilt axis, at a second frequency which is lower than the first frequency; modulating the second control signal by binary modulation of the second control signal, at the first frequency; and controlling force coupling elements of the micro-mirror, using the modulated second control signal and the first control signal.

9 Claims, 9 Drawing Sheets

CONTROL DEVICE FOR A MICROMIRROR, METHOD FOR CONTROLLING A MICROMIRROR AND IMAGE PROJECTION SYSTEM

RELATED APPLICATION INFORMATION

The present application claims priority to and the benefit of German patent application no. 10 2011 081 042.0, which was filed in Germany on Aug. 16, 2011, the disclosure of which is incorporated herein by reference.

FIELD OF THE INVENTION

The present invention relates to a control device for a micro-mirror, a method for controlling a micro-mirror, and an image projection system.

BACKGROUND INFORMATION

Micro-mirrors are frequently used for image projection, whereby, for example, laser beams in bundled form strike a biaxially suspended micro-mirror and are deflected by same onto a projection surface. An image may be rasterized on the projection surface by synchronizing the intensity modulation and optionally the color modulation of the laser beam with the motions of the micro-mirror.

The control is carried out in such a way that the micro-mirror is tilted horizontally and vertically, so that an image is built up line by line. After each image line the tilt of the vertical axis may, for example, be slightly increased so that the individual image lines are projected, one below the other, on the projection surface. This process may be iterated at an image refresh rate of greater than 50 Hz, thus giving the observer the impression of a stationary image, or optionally a sequence of moving images.

The micro-mirror may be tilted with the aid of actuating elements, whereby a mechanical, electrostatic, magnetic force or a force generated in some other way is selectively exerted on a plurality of actuating elements in order to deflect the micro-mirror with respect to one or both of the tilt axes of the micro-mirror. As a result of the micro-mirror being in almost constant motion due to the image build-up pixel by pixel, a high energy level is necessary to actuate the actuating elements. In particular when these types of image projection systems are used in devices having a limited power supply, for example in portable electronic devices having accumulators as a power source, it is desirable to minimize the energy consumption resulting from the control of micro-mirrors in order to prolong the operating time of the devices.

The publication U.S. Pat. No. 7,515,329 B2 discusses, for example, methods for the resonant control of MEMS mirrors, using control signals which are subdivided on two mirror axes.

SUMMARY OF THE INVENTION

According to one specific embodiment, the present invention provides a method for controlling a micro-mirror, having the steps of generating a first control signal which encodes a tilting motion of the micro-mirror about a first tilt axis, at a first frequency; generating a second control signal which encodes a tilting motion of the micro-mirror about a second tilt axis which is perpendicular to the first tilt axis, at a second frequency which is lower than the first frequency; modulating the second control signal by binary modulation, for example pulse width modulation, of the second control signal, at the first frequency; and controlling force coupling elements of the micro-mirror, using the modulated second control signal and the first control signal.

According to another specific embodiment, the present invention provides a control device for controlling a micro-mirror, having a first signal generator which is configured to generate a first control signal which encodes a tilting motion of the micro-mirror about a first tilt axis, at a first frequency; a second signal generator which is configured to generate a second control signal which encodes a tilting motion of the micro-mirror about a second tilt axis which is perpendicular to the first tilt axis, at a second frequency which is lower than the first frequency; a modulator which is connected to the first signal generator and the second signal generator and which is configured to modulate the second control signal by binary modulation, for example pulse width modulation, of the second control signal, at the first frequency; and an actuator device which is connected to the modulator and which is configured to control force coupling elements of the micro-mirror, using the modulated second control signal and the first control signal.

According to another specific embodiment, the present invention provides an image projection system having a micro-mirror system which includes at least one micro-mirror having a plurality of force coupling elements, an image generation device which is configured to generate light beams according to predetermined image data and to direct the light beams onto the at least one micro-mirror of the micro-mirror system, an image data generation device which is configured to generate predetermined image data and to supply same to the image generation device, and a control device according to the present invention which is configured to generate tilting motions of the at least one micro-mirror by controlling the plurality of force coupling elements so that the light beams generated by the image generation device are deflected by the at least one micro-mirror to generate an image which corresponds to the image data.

It is an aspect of the exemplary embodiments and/or exemplary methods of the present invention to modulate high-frequency signal components to control signals for tilting motions about the vertical tilt axis of a micro-mirror by suitable binary modulation, for example pulse width modulation, to be able to provide the actuation energy that is necessary for the horizontal tilting motions of the micro-mirror, not only via the control signals for tilting motions about the horizontal tilt axis of the micro-mirror, but also via the control signals for tilting motions about the vertical tilt axis. Due to the spectral separation of the frequency components of both control signals, by use of the exemplary embodiments and/or exemplary methods of the present invention it is possible to distribute this actuation energy over the control signals for vertical tilting motions in such a way that the vertical tilting motions are not affected, or are affected only to a slight extent.

This offers the advantage, on the one hand, that the introduced actuation energy may be significantly increased when the micro-mirror is acted on by the control signals generated according to the exemplary embodiments and/or exemplary methods of the present invention. This additional energy may be used, for example, for achieving larger horizontal deflection angles, which is very advantageous for present image projection systems having an aspect ratio of 16:9, compared to the conventional aspect ratio of 4:3.

On the other hand, for example for existing systems having a sufficient horizontal deflection angle, the chip surface area of the drive and control system may be reduced in a cost-effective manner.

Lastly, according to the exemplary embodiments and/or exemplary methods of the present invention, digital switching stages may be advantageously used in the control electronics system. Compared to conventional linear driver stages, less chip surface area is required for this purpose, and a higher efficiency is achieved. The necessary actuation energy for moving the micro-mirror may thus be used more efficiently, which in particular for portable electronic products contributes to a prolonged run time of the energy store.

The first frequency may advantageously be a resonant frequency of the micro-mirror with regard to the deflection about the first tilt axis. The second frequency may be below the resonant frequency of the micro-mirror with regard to the deflection about the second tilt axis. Spectral decoupling of the control signals for a horizontal tilt axis and a vertical tilt axis of the micro-mirror is thus possible, so that the mutual influence of the tilting motions by the combined first and second control signals used for the control is advantageously negligible. Moreover, it is thus possible to transfer signal energy for the resonant actuation of the tilting motion about the first tilt axis to the force coupling elements of the micro-mirror, using high-frequency signal components of the control signal at the second frequency.

The control signals may advantageously be split into partial control signals which in each case are configured for controlling different force coupling elements of the micro-mirror. A targeted control of force coupling elements of the micro-mirror is thus possible. In addition, the partial signal generation may be better coordinated with the number and type of force coupling elements of the micro-mirror.

One advantageous control method may also have the steps of comparing the amplitude of the second control signal to a pulse width threshold value, generating a converted control signal from the second control signal on the basis of the comparison, the converted control signal on average having a greater signal amplitude than the second control signal, and generating a third control signal from the converted control signal, the third control signal being pulse width-modulated at the first frequency. This method offers the advantage that even in time intervals in which the energy input of the binary modulation, for example the pulse width for a pulse width modulation, is low due to the small amplitude of the second control signal for controlling the second tilt axis, auxiliary signals which cancel each other out with regard to the deflection of the micro-mirror about the second tilt axis may be superimposed on the second control signal. When the control for deflecting the micro-mirror about the second tilt axis is not impaired or influenced by the auxiliary signals, or if so, only to a slight extent, the auxiliary signals may advantageously contribute to an increased energy transmission to the force coupling elements of the micro-mirror for assisting in the tilting motion about the first tilt axis.

Exemplary refinements are the subject matter of the respective descriptions herein.

The above-mentioned embodiments and refinements may be arbitrarily combined with one another, if meaningful. Further possible embodiments, refinements, and implementations of the present invention also include combinations, not explicitly stated, of features of the present invention described above or below with regard to the exemplary embodiments.

Further features and advantages of specific embodiments of the present invention result from the following description, with reference to the appended drawings.

DETAILED DESCRIPTION

Unless stated otherwise, in each case identical and functionally corresponding elements, features, and components are provided with the same reference numerals in the figures of the drawing. It is understood that for reasons of clarity and understandability, components and elements are not necessarily illustrated to scale relative to one another in the drawings.

Figure 1:
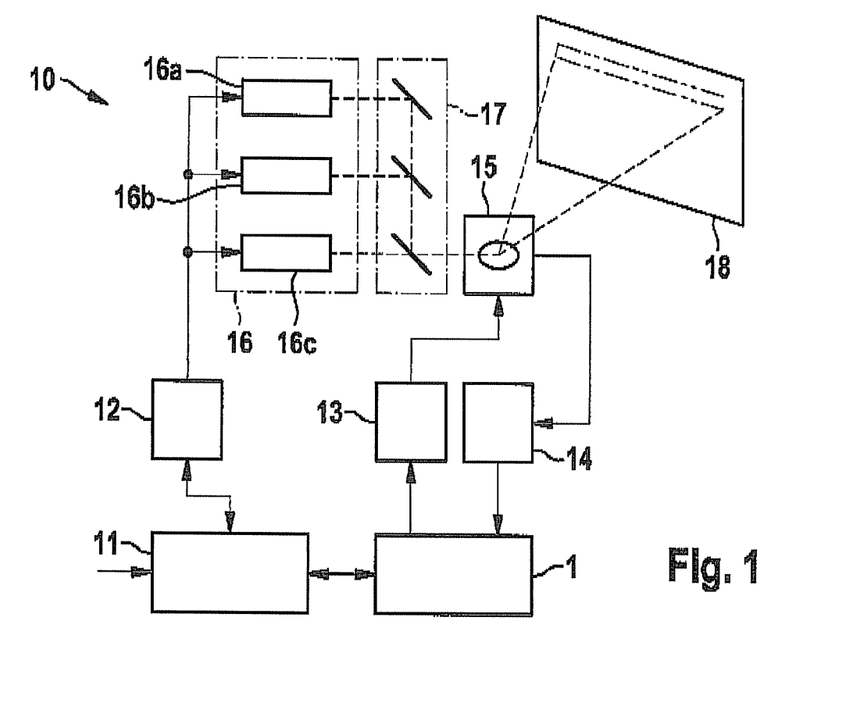
FIG. 1 shows a schematic illustration of an image projection system according to one specific embodiment of the present invention.

FIG. 1 shows an image projection system 10 having a micro-mirror system 15. An image data generation device 11 is configured to receive an external image signal or video signal of an image or video to be displayed, and to generate therefrom image data which are used for controlling a driver device 12. Driver device 12 is configured to generate appropriate driver signals via which an image generation device 16 is controlled. Image generation device 16 may have, for example, a plurality of lasers 16a, 16b, 16c, for example differently colored lasers for generating red, green, and blue laser beams. Lasers 16a, 16b, 16c may be modulatable in their intensity according to the driver signals. The laser beams generated by lasers 16a, 16b, 16c are united via a deflection device 17, for example with the aid of dichroic mirrors, to form a combined laser beam which is directed onto a micro-mirror of a micro-mirror system 15. The laser beam is directed by the micro-mirror, corresponding to the position of the micro-mirror, onto a projection surface 18, where a pixel of desired color and/or intensity is generated.

Figure 2:
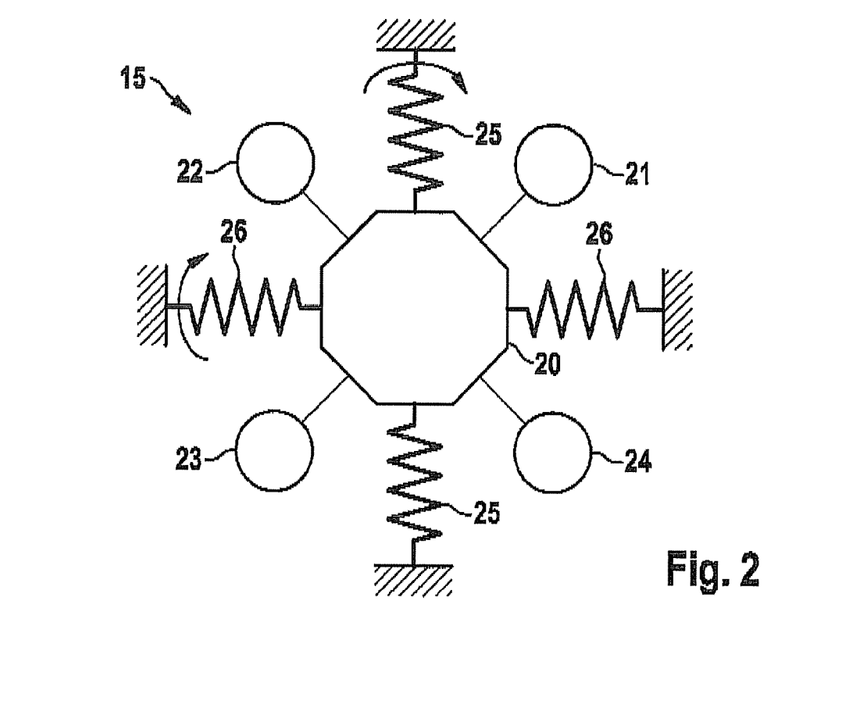
FIG. 2 shows a schematic illustration of a micro-mirror system according to another specific embodiment of the present invention.

FIG. 2 shows a schematic illustration of a micro-mirror system 15 of system 10 in FIG. 1. Micro-mirror system 15 has a micro-mirror 20 which is biaxially tiltable via spring elements 25 and 26 in micro-mirror system 15 and fixedly mounted. Spring elements 25 and 26 are schematically indicated as springs, whereby spring elements 25 and 26 may include any given elements which are able to generate a restoring force when torsioned about an axis indicated by the arrows in FIG. 2.

Micro-mirror system 15 also includes force coupling elements 21, 22, 23, and 24 via which a torsion or tilting motion of micro-mirror 20 about one of the two mutually perpendicular tilt axes which are defined by spring elements 25 and 26 is made possible by application of force. Force coupling elements 21, 22, 23, and 24 are only illustrated schematically here. However, it should be apparent to those skilled in the art that any given systems for external force coupling via force coupling elements 21, 22, 23, and 24 on micro-mirror 20 are possible. The force coupling may occur, for example, by mechanical, electrostatic, magnetic, or other manner. The number of force coupling elements 21, 22, 23, and 24 is given as four in FIG. 2 as an example, although any other number of force coupling elements 21, 22, 23, and 24 may also be possible. For example, a force coupling on force coupling element 21 into the plane of the drawing may bring about a torsion or tilting of micro-mirror 20 about the first tilt axis defined by spring elements 25, and also about the second tilt axis of micro-mirror 20 defined by spring elements 26.

Figure 3:
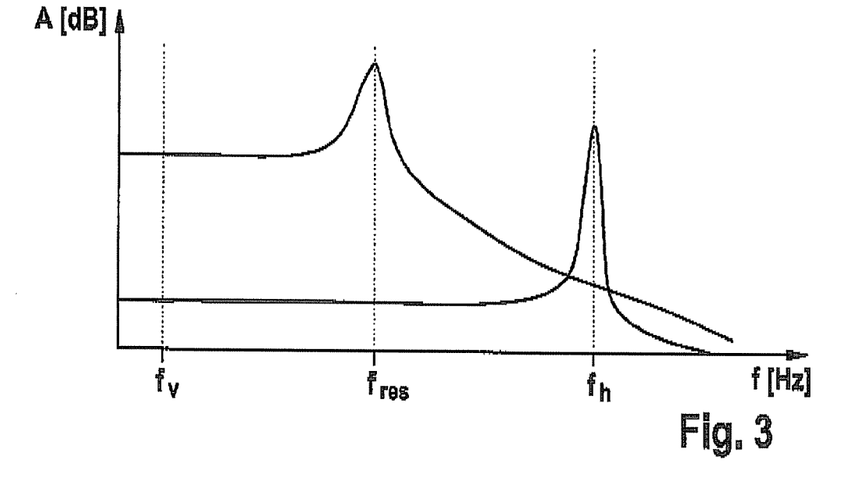
FIG. 3 shows a frequency-amplitude diagram of excitation frequencies for a micro-mirror system according to another specific embodiment of the present invention.

FIG. 3 shows a frequency-amplitude diagram of excitation frequencies for a micro-mirror system 15 according to FIGS. 1 and 2. The frequency is plotted logarithmically on the abscissa. Spring elements 25 and 26 may be selected in such a way, for example, that a torsion or tilting about a first, vertical tilt axis of micro-mirror 20 has a resonance at a frequency $f_{res}$, and that a torsion or tilting about a second, horizontal tilt axis of micro-mirror 20 which is perpendicular to the first tilt axis has a resonance at a frequency $f_h$. The horizontal tilting motion of the micro-mirror may typically occur at frequency $f_h$. For this purpose, frequency $f_h$ may be higher than 15 kHz, for example. By operating micro-mirror 20 at resonant frequency $f_h$, use is made of the resonance sharpness in order to achieve large horizontal deflection angles at low excitation energy.

As is apparent from FIG. 3, at frequency $f_h$ the damping of the tilting motions about the vertical axis is very high. At the same time, when torsioned about the vertical axis the spring-mass system composed of spring elements and micro-mirror 20 has a resonance at frequency $f_{res}$, so that for achieving a precise line linearity for an image projection, frequency components at frequency $f_{res}$ are avoided. Instead, as the frequency for the control signals of the tilting motions about the vertical tilt axis of micro-mirror 20, a frequency $f_v$ is selected which is far below frequency $f_{res}$, and which may be, for example, several multiples of 10 Hz to 100 Hz, for example 50 Hz to 70 Hz. At frequency $f_v$, the tilting motion of micro-mirror 20 about the horizontal axis is highly damped. For the proper functioning of the control of micro-mirrors 20, it may be advantageous to select frequencies $f_v$ and $f_h$ far enough apart from one another that crosstalk of the horizontal and vertical control signals for micro-mirror 20 is avoided.

With reference to FIG. 1 once again, image projection system 10 includes a control device 1 which is configured to generate signals for micro-mirror system 15, i.e., micro-mirror 20. The control signals may be supplied to an actuator device 13 which causes actuation of corresponding force coupling elements 21, 22, 23, 24 of micro-mirror system 15 as a function of the control signals. System 10 may also have a detection device 14 which is designed to detect the deflections of micro-mirror 20 actually caused by the control signals, and to transmit same back to control device 1 in a feedback loop. Control device 1 may use the detected deflections of detection device 14 in order to adapt the control signals.

Figure 4:
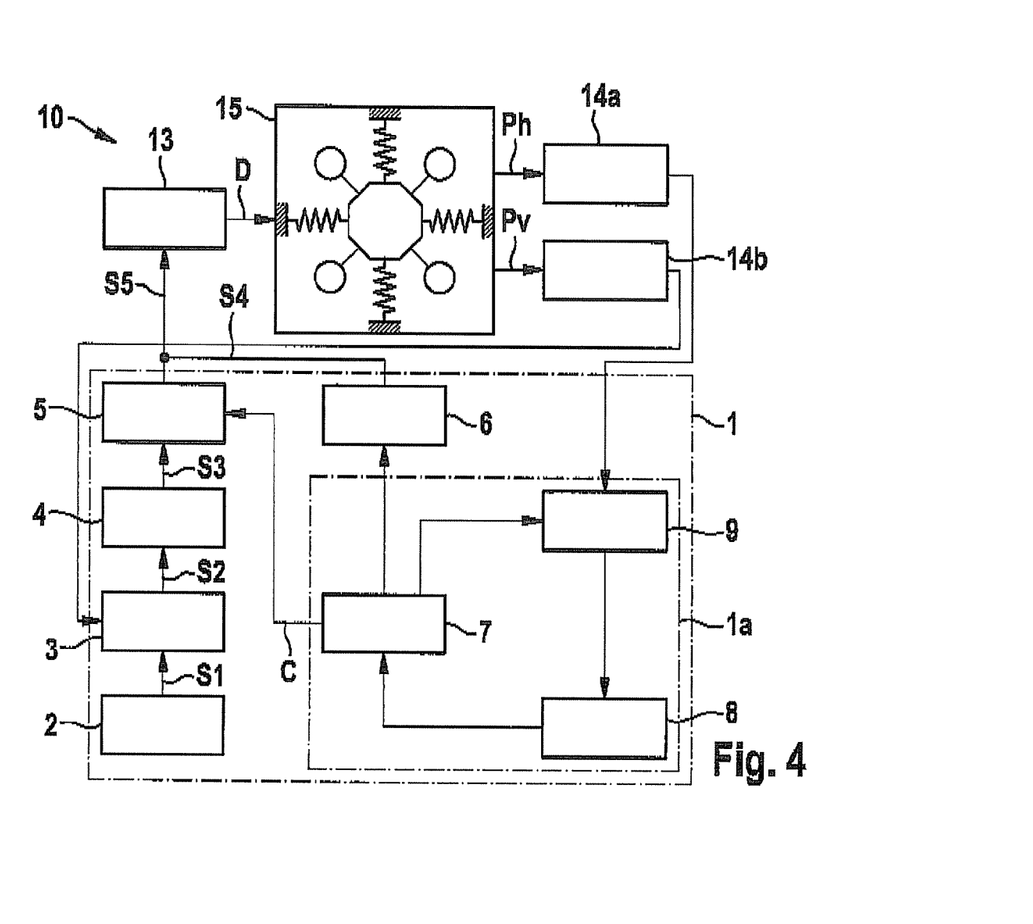
FIG. 4 shows a schematic illustration of a system for controlling a micro-mirror according to another specific embodiment of the present invention.

FIG. 4 shows a schematic illustration of a section of system 10 for controlling a micro-mirror 20 in a micro-mirror system 15 in greater detail. System 10 includes control device 1, actuator device 13, and micro-mirror system 15. Detection device 14 from FIG. 1 is illustrated in two parts in FIG. 4, as detection device 14a for horizontal deflections Ph, and as detection device 14b for vertical deflections Pv of micro-mirror 20.

Control device 1 includes a first signal generator 2, a signal converter 3, a first signal splitter 4, a modulator 5, a second signal splitter 6, and a closed loop 1a. Closed loop 1a may include a second signal generator 7, a frequency control loop 8, and a phase detector 9. The mode of operation of the individual elements of control device 1 is explained in greater detail below, with reference to the signals shown in the diagrams in FIGS. 5a through 5d.

Figure 5A:
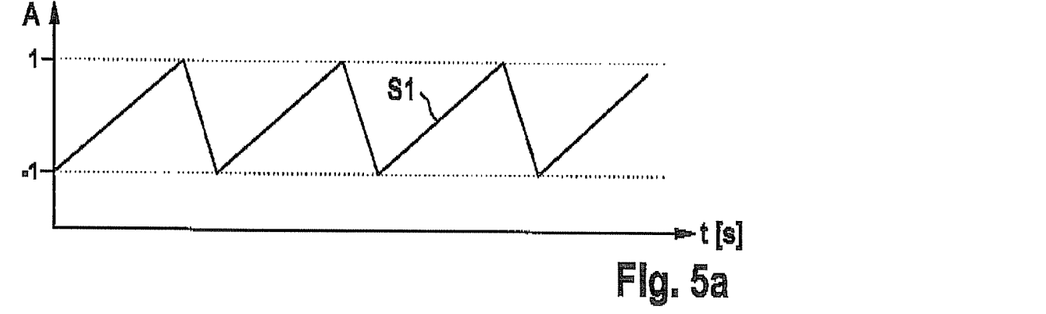
FIGS. 5a, 5b, 5c, and 5d show signal diagrams for control signals in a system for controlling a micro-mirror according to another specific embodiment of the present invention.
Figure 5B:
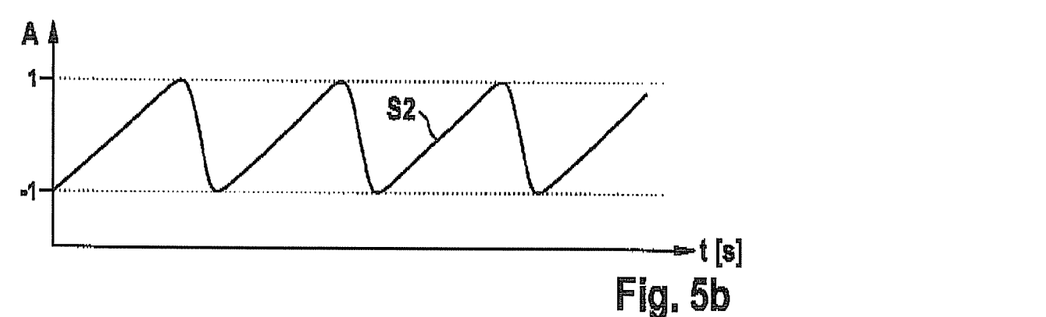

First signal generator 1 is configured to generate a control signal S1 which may be used for controlling the vertical tilting motions about a first tilt axis of micro-mirror 20. For example, control signal S1 may be a sawtooth signal, as illustrated in the signal diagram in FIG. 5a. The sawtooth signal may have a repetition frequency which corresponds to frequency $f_v$ for controlling the vertical tilting motions of micro-mirror 20. Control signal S1 may be transmitted to a signal converter 3, which may also receive check-back signals from detection device 14b about actual vertical deflection Pv of micro-mirror 20. Signal converter 3 may be configured to condition control signal S1 by suitable filtering and/or regulation according to the feedback signal received from detection device 14b. For example, signal converter 3 may be configured to convert control signal S1 into a control signal S2, as illustrated in FIG. 5b.

Figure 5C:
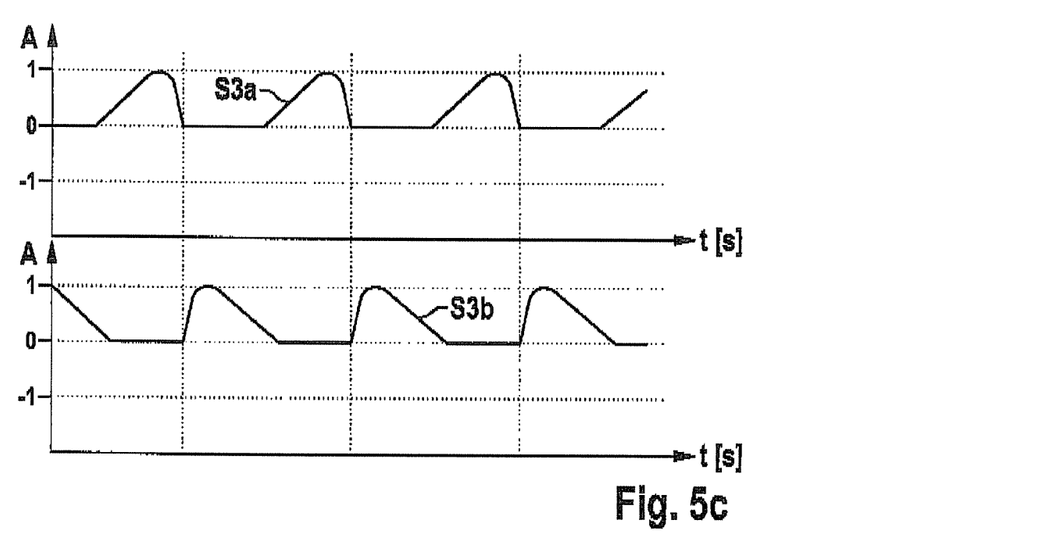
Figure 5D:
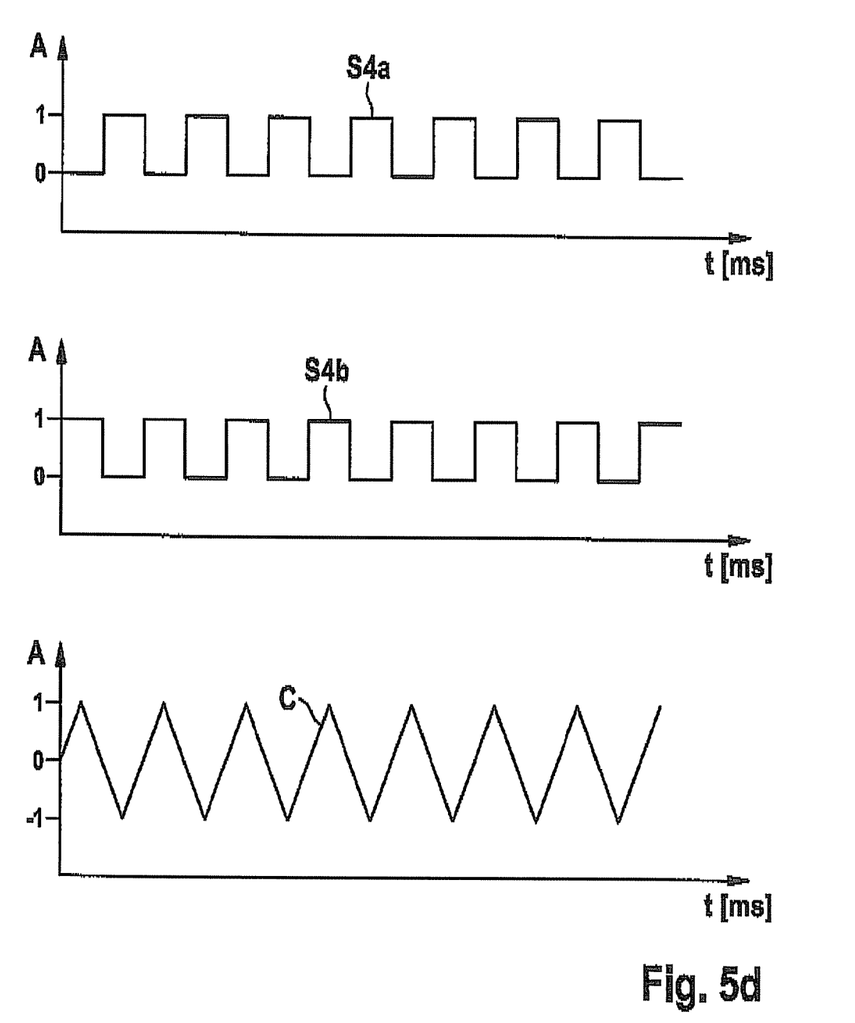

First signal splitter 4 may be configured to receive converted control signal S2 and to split it into two partial control signals S3a and S3b, as illustrated in FIG. 5c. Partial control signal S3b results, among other things, from inversion from control signal S2. Partial control signals S3a and S3b may each have positive amplitudes and, for example, be used for actuating force coupling element pairs 21 and 22; 23 and 24 of micro-mirror system 15.

At the same time, second signal generator 7 may be configured to generate a control signal S4 for controlling the horizontal tilting motions of micro-mirror 20 about a horizontal tilt axis. Control signal S4 may be split into two components S4a and S4b in signal splitter 6, for example, as shown in the top two diagrams in FIG. 5d. Partial control signals S4a and S4b may have, for example, rectangular-pulse signals having a frequency $f_h$, which corresponds to the resonant frequency of a torsion motion of micro-mirror 20 about the horizontal tilt axis. Partial control signals S4a and S4b may each have positive amplitudes and, for example, be used for actuating force coupling element pairs 21 and 24; 22 and 23 of micro-mirror system 15. Control signal S4 may be formed, for example, from a triangular signal C, as illustrated, for example, in the bottom diagram in FIG. 5d. Second signal generator 7 may also be configured to transmit triangular signal C to modulator 5 for further processing. Furthermore, second signal generator 7 may be configured for clocking first signal generator 2.

Second signal generator 7 may be connected to phase detector 9 and frequency control loop 8 in a closed loop 1a, for example a phase-locked loop (PLL), and adjust the generation of control signal S4 to actual horizontal deflections Ph of the micro-mirror fed back from detection device 14a.

Modulator 5 receives control signal S3 or partial control signals S3a and S3b, and is configured to modulate control signal S3 or partial control signals S3a and S3b by binary modulation, for example PWM modulation. The PWM modulation takes place at frequency $f_h$ of control signal C which is provided by second signal generator 7, so that modulator 5 emits a pulse width-modulated control signal S5 to actuator device 13 for controlling force coupling elements 21 through 24. Due to the PWM modulation, high-frequency signal components may be modulated to control signal S3 at the resonant frequency of micro-mirror 20 when there are torsion motions about the horizontal tilt axis. This requires that the high-frequency signal components be able to provide an additional torque for the horizontal tilt axis, without the tilting motions about the vertical tilt axis being influenced. It must be ensured that no spurious modes, in particular not the resonance mode of the vertical tilt axis at resonant frequency $f_{res}$, are excited.

In other words, actuator device 13 receives, on the one hand, horizontal control signals S4 or partial control signals S4a and S4b, which are used for generating high-frequency tilting motions about the horizontal tilt axis of micro-mirror 20 by actuating force coupling element pairs 21 and 22; 23 and 24. On the other hand, actuator device 13 receives vertical control signals S5 or partial control signals S5a and S5b, which are used for generating low-frequency tilting motions about the vertical tilt axis of micro-mirror 20 by actuating force coupling element pairs 21 and 24; 22 and 23. At the same time, however, the high-frequency signal components of pulse width-modulated vertical control signals S5 provide for an additional application of force on the force coupling elements which intensify the horizontal tilting motions, without appreciable impairment of the vertical tilting motions. It is thus possible to transfer additional drive energy to the horizontal tilt axis. As a result of the pulse width modulation of control signals S5, the gain in drive energy may be approximately 30% compared to the pure signal coupling of control signals S4.

It is understood that any type of binary modulation is suitable for modulating the control signals, and the PWM modulation is explained in greater detail below strictly as an example.

Figure 6:
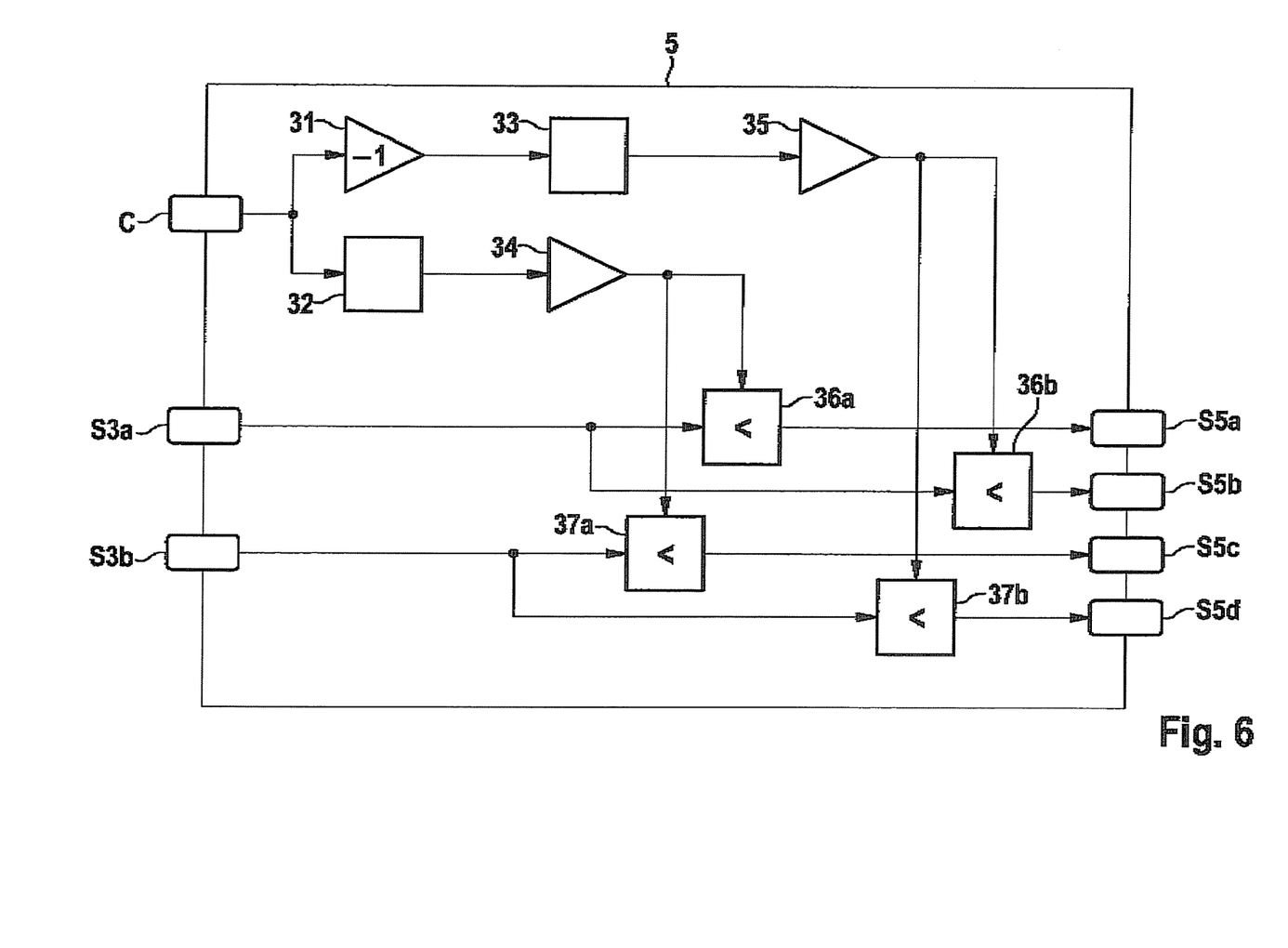
FIG. 6 shows a schematic illustration of a PWM modulator of a system for controlling a micro-mirror according to another specific embodiment of the present invention.

FIG. 6 shows a schematic illustration of one example of a design of a modulator 5. With the aid of the function blocks of an inverter 31, a bias generator 33, and an amplifier 35 on the one hand, and the function blocks of a bias generator 32 and an amplifier 34 on the other hand, triangular signal C provided by second signal generator 7 may be split into two triangular signals in phase opposition, which are supplied to comparators 36a and 37a; 36b and 37b, respectively. Partial control signals S3a and S3b of first signal splitter 4 may likewise be supplied to comparators 36a and 36b; 37a and 37b, respectively, so that partial control signals S5a, S5b, S5c, and S5d are provided at the signal outputs of the modulator. Partial control signals S5a, S5b, S5c, and S5d are pulse width-modulated control signals which may be used for actuating individual force coupling elements 21, 22, 23, and 24 of micro-mirror system 15.

Figure 7:
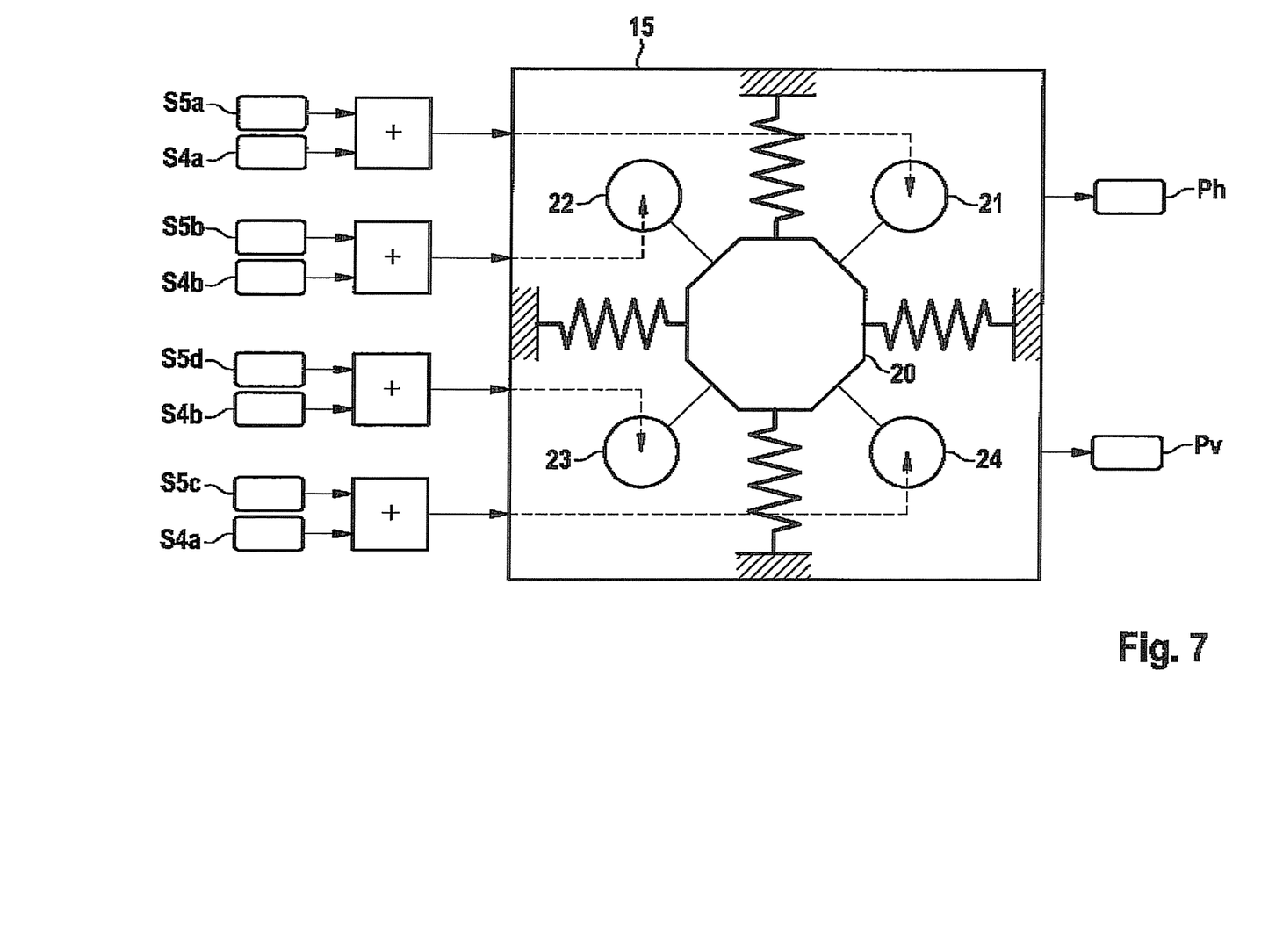
FIG. 7 shows a schematic illustration of control signals of a micro-mirror system according to another specific embodiment of the present invention.

Partial control signals S5a, S5b, S5c, and S5d together with horizontal partial control signals S4a and S4b may be transmitted to actuator device 13, in which the partial control signals for controlling individual force coupling elements 21, 22, 23, and 24 of micro-mirror system 15 may be combined. FIG. 7 shows an example of one possible combination of the partial control signals. For example, partial control signals S5a and S4a may be summed or superimposed and used for actuating force coupling element 21. Similar combination rules apply for the remaining partial control signals.

Figure 8:
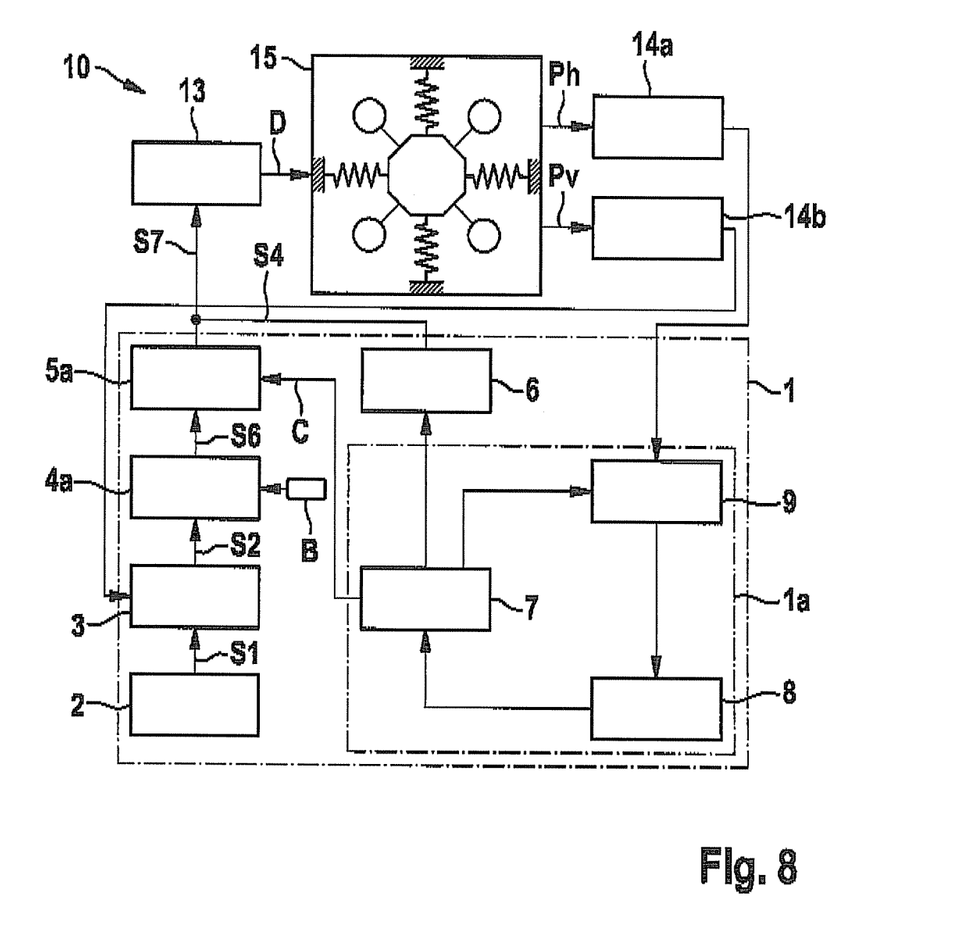
FIG. 8 shows a schematic illustration of a system for controlling a micro-mirror according to another specific embodiment of the present invention.

FIG. 8 shows a schematic illustration of a modified system 10 for controlling a micro-mirror 20. System 10 in FIG. 8 differs from system 10 in FIG. 4 in that first signal splitter 4 has been replaced by a signal converter logic system 4a. Signal converter logic system 4a may be configured to receive converted control signal S2 of signal converter 3 and convert it into a modified control signal S6 according to a predetermined pulse width threshold value B.

Figure 9:
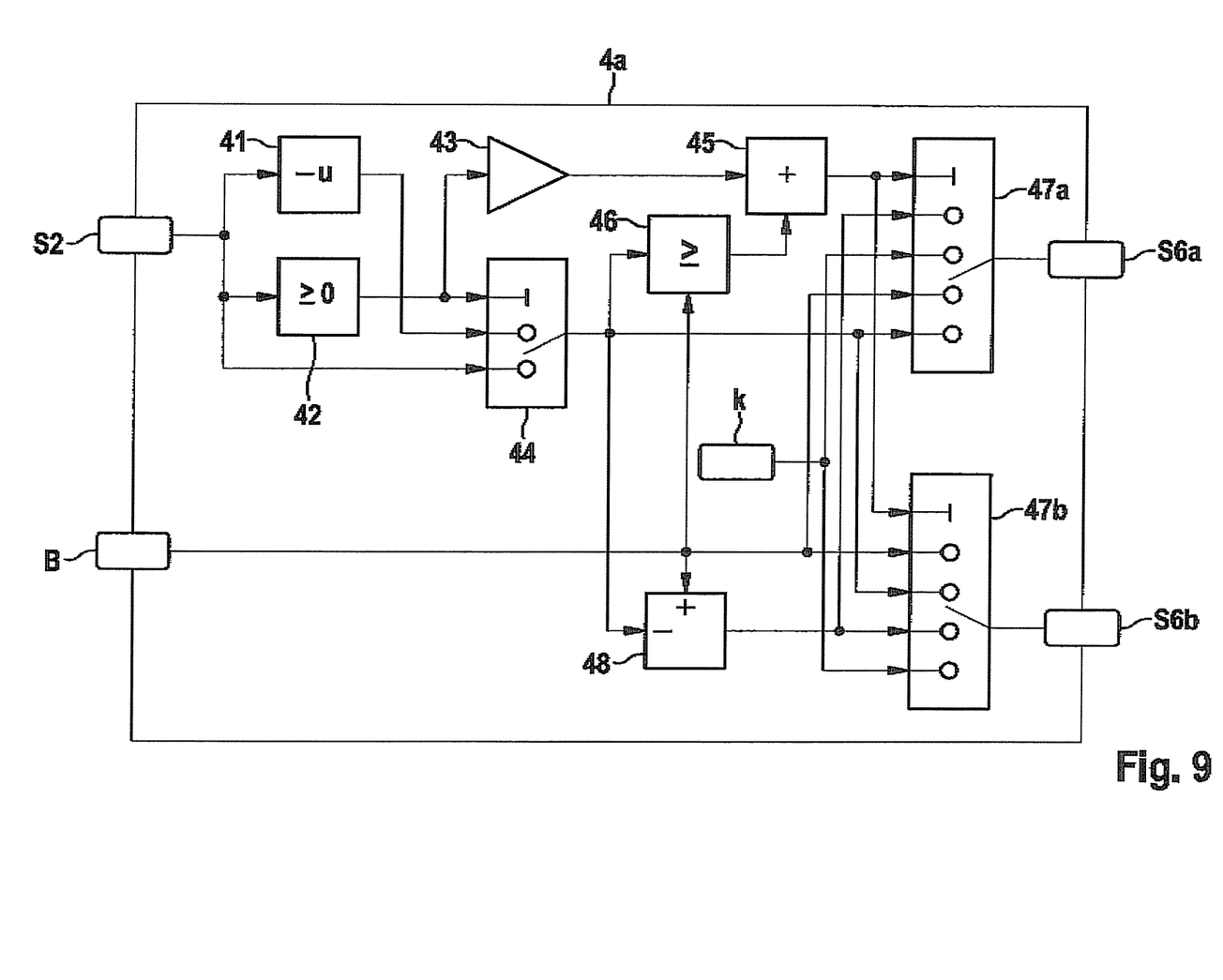
FIG. 9 shows a schematic illustration of a PWM modulator of a system for controlling a micro-mirror according to another specific embodiment of the present invention.
Figure 10:
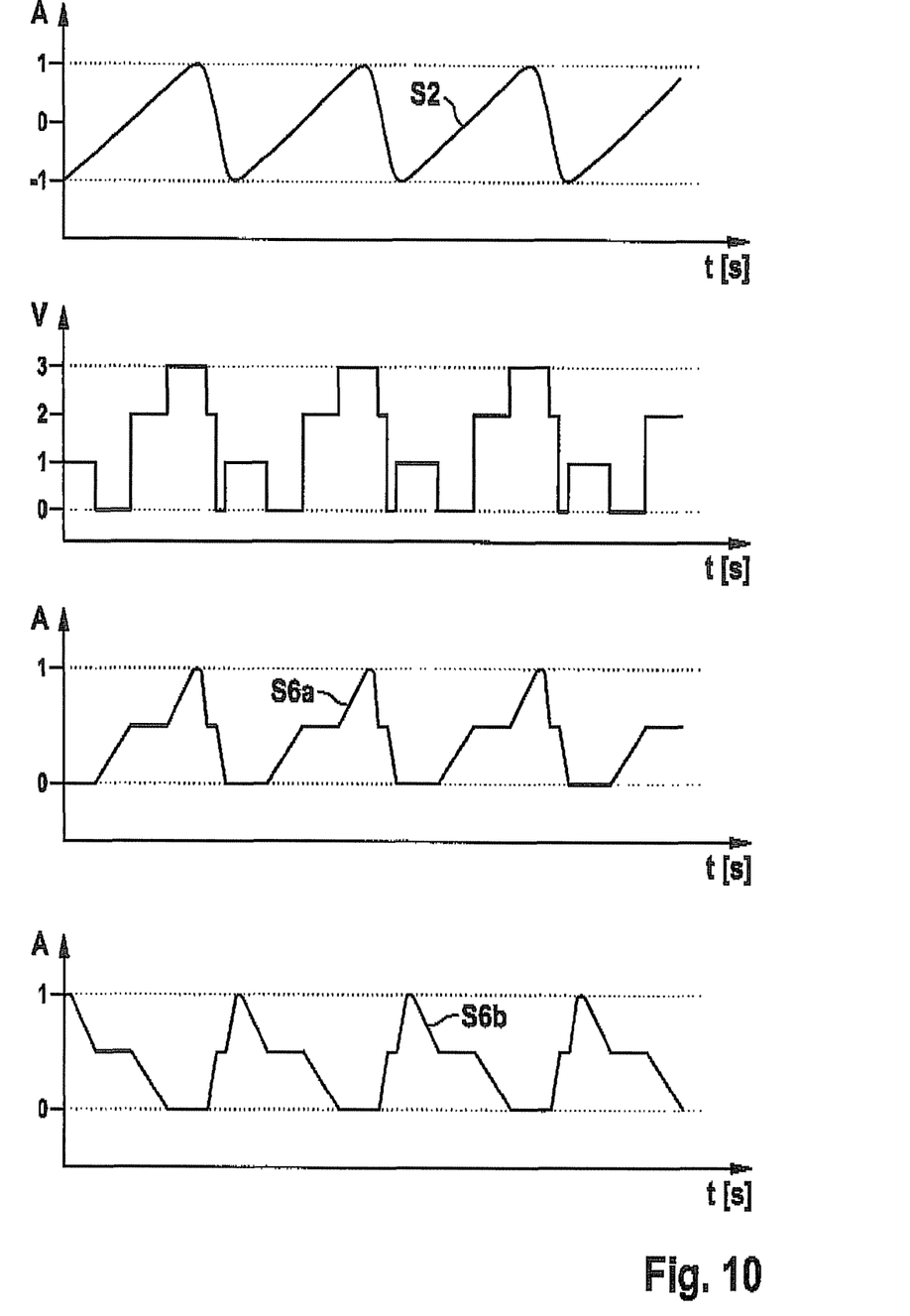
FIG. 10 shows signal diagrams for control signals in a system for controlling a micro-mirror according to another specific embodiment of the present invention.

As shown in FIG. 10, control signal S2 has areas in which the absolute value of amplitude A is low, i.e., areas in which the vertical deflection about the vertical tilt axis of micro-mirror 20 is low. For a binary modulation, for example a pulse width modulation, in modulator 5 according to the above-described procedure, the energy input of modulated vertical control signal S5 in these areas is therefore very small. Due to the low energy input (using the example of a pulse width modulation, the small pulse width), the option for transmitting drive energy to the force coupling elements is limited compared to the areas in which a high vertical deflection of micro-mirror 20 occurs. The signal converter logic system 4a may therefore be configured to compare the pulse widths of pulse width-modulated control signal S5 which are to be expected to predetermined and settable pulse width threshold value B. For this purpose, signal converter logic system 4a may have the design shown in FIG. 9 as an example. Control signal S2 is supplied to two multiplexers 47a and 47b via function blocks 41, 42, 43, and 45 and multiplexer 44. By comparing the amplitude of control signal S2, which is likewise supplied to multiplexers 47a and 47b, to pulse width threshold value B at comparator blocks 46 and 48, partial control signals S6a and S6b which have the signal curves shown in the bottom diagrams in FIG. 10, for example, may be generated in each case at the signal outputs of signal converter logic system 4a. Multiplexers 47a and 47b may be operated according to selection function V shown in the second signal diagram in FIG. 10 in order to selectively provide control signal S2, pulse width threshold value B, a constant zero line k, or inverted control signal S2 to the signal outputs of signal converter logic system 4a. In this way, partial control signals S6a und S6b may be generated which on average have a higher absolute amplitude than partial control signals S3a and S3b.

Modulator 5a in FIG. 8 may be configured to subject partial control signals S6a and S6b of signal converter logic system 4a to a binary modulation, for example a pulse width modulation, at first frequency $f_h$ of triangular signal C, and to generate a modulated control signal S7 or partial control signals S7a and S7b. Modulated control signal S7 or partial control signals S7a and S7b may be generated similarly as for modulated control signal S5 or partial control signals S5a and S5b. It must be ensured that in areas in which control signal S2 would have pulse energies below predetermined pulse width threshold value B after a binary modulation, for example a pulse width modulation, partial control signals S6a and S6b in each case have overlapping drive signals. However, these drive signals are supplied, symmetrically with respect to the vertical tilt axis of micro-mirror 20, by the corresponding force coupling via force coupling elements 21 through 24. No vertical deflection results with regard to the tilting motion about the vertical tilt axis, since the high-frequency signal components of partial control signals S6a and S6b just cancel each other out in these areas.

Due to the pulse width which on average is higher across all pulses of the binary-modulated control signals S5, an increased supply of signal energy for assisting in the horizontal tilting motion of the micro-mirror may be ensured which is approximately 50% higher than the signal energy supply of control signals S4.

What is claimed is:

1. A method for controlling a micro-mirror, the method comprising:

generating a first control signal which encodes a tilting motion of the micro-mirror about a first tilt axis, at a first frequency;

generating a second control signal which encodes a tilting motion of the micro-mirror about a second tilt axis which is perpendicular to the first tilt axis, at a second frequency which is lower than the first frequency;

modulating the second control signal by binary modulation of the second control signal, at the first frequency; and controlling force coupling elements of the micro-mirror, using the modulated second control signal and the first control signal.

2. The method of claim 1, wherein the first frequency is a resonant frequency of the micro-mirror with regard to the deflection about the first tilt axis, and the second frequency is below the resonant frequency of the micro-mirror with regard to the deflection about the second tilt axis.

3. The method of claim 1, further comprising:

splitting the modulated second control signal and the first control signal into partial control signals which in each case are configured for controlling different force coupling elements of the micro-mirror.

4. The method of claim 1, the method comprising:

comparing the amplitude of the second control signal to a pulse width threshold value;

generating a converted control signal from the second control signal based upon the comparison, the converted control signal on average having a greater signal amplitude than the second control signal; and generating a third control signal from the converted control signal, the third control signal being binary-modulated at the first frequency.

5. The method of claim 4, wherein the third control signal on a time average basis encodes the tilting motion, which is encoded by the second control signal, of the micro-mirror about the second tilt axis.

6. A control device for controlling a micro-mirror, comprising:

a first signal generator which is configured to generate a first control signal which encodes a tilting motion of the micro-mirror about a first tilt axis, at a first frequency;

a second signal generator which is configured to generate a second control signal which encodes a tilting motion of the micro-mirror about a second tilt axis which is perpendicular to the first tilt axis, at a second frequency which is lower than the first frequency;

a modulator which is connected to the first signal generator and the second signal generator and which is configured to modulate the second control signal by binary modulation of the second control signal, at the first frequency; and an actuator device which is connected to the modulator and which is configured to control force coupling elements of the micro-mirror, using the modulated second control signal and the first control signal.

7. The control device of claim 6, further comprising:

a first signal splitter which is coupled between the first signal generator and the actuator device, and which is configured to split the first control signal into first partial signals for controlling different force coupling elements of the micro-mirror; and a second signal splitter which is coupled between the second signal generator and the modulator, and which is configured to split the second control signal into second partial signals for controlling different force coupling elements of the micro-mirror.

8. The control device of claim 6, wherein the first frequency is a resonant frequency of the micro-mirror with regard to the deflection about the first tilt axis, and the second frequency is below the resonant frequency of the micro-mirror with regard to the deflection about the second tilt axis.

9. An image projection system, comprising:

a micro-mirror system which includes at least one micro-mirror having a plurality of force coupling elements;

an image generation device which is configured to generate light beams according to predetermined image data and to direct the light beams onto the at least one micro-mirror of the micro-mirror system;

an image data generation device which is configured to generate predetermined image data and to supply same to the image generation device; and a control device, which is configured to generate tilting motions of the at least one micro-mirror by controlling the plurality of force coupling elements so that the light beams generated by the image generation device are deflected by the at least one micro-mirror to generate an image which corresponds to the image data control device for controlling a micro-mirror, wherein the control device includes:

a first signal generator which is configured to generate a first control signal which encodes a tilting motion of the micro-mirror about a first tilt axis, at a first frequency;

a second signal generator which is configured to generate a second control signal which encodes a tilting motion of the micro-mirror about a second tilt axis which is perpendicular to the first tilt axis, at a second frequency which is lower than the first frequency;

a modulator which is connected to the first signal generator and the second signal generator and which is configured to modulate the second control signal by binary modulation of the second control signal, at the first frequency; and an actuator device which is connected to the modulator and which is configured to control force coupling elements of the micro-mirror, using the modulated second control signal and the first control signal.

\* \* \* \* \*